US007040644B1

(12) United States Patent
Adams et al.

(10) Patent No.: US 7,040,644 B1

(45) Date of Patent: May 9, 2006

(54) HYDRAULIC THREE POINT HITCH

(76) Inventors: Charles M. Adams, 6610 28th Ave., E., Bradenton, FL (US) 34208; Michael S. Adams, 6620 28th Ave. E., Bradenton, FL (US) 34208

( * ) Notice: Subject to any disclaimer, the term of this patent is extended or adjusted under 35 U.S.C. 154(b) by 290 days.

(21) Appl. No.: 10/748,067

(22) Filed: Dec. 29, 2003

Related U.S. Application Data

(60) Provisional application No. 60/436,973, filed on Dec. 30, 2002.

(51) Int. Cl.
*A01B 59/043* (2006.01)

(52) U.S. Cl. .................... 280/460.1; 280/186; 172/439

(58) Field of Classification Search ................ 280/186, 280/511, 456.1, 460.1; 172/439, 677
See application file for complete search history.

(56) References Cited

U.S. PATENT DOCUMENTS

| | | | | |
|---|---|---|---|---|
| 2,472,905 | A * | 6/1949 | Kass | 280/492 |
| 2,617,660 | A * | 11/1952 | Hadlock | 172/439 |
| 2,711,805 | A * | 6/1955 | Hallead | 280/186 |
| 3,658,361 | A * | 4/1972 | Van Wyk | 172/248 |
| 3,749,421 | A * | 7/1973 | Rudd | 172/439 |
| 3,829,128 | A * | 8/1974 | Sutton | 172/272 |
| 4,199,167 | A * | 4/1980 | Points | 280/416.2 |
| 4,340,240 | A * | 7/1982 | Anderson | 280/461.1 |
| 4,664,403 | A * | 5/1987 | Livingston | 280/460.1 |
| 5,146,736 | A * | 9/1992 | Tonutti | 56/14.9 |
| D341,810 | S | 11/1993 | Cordia | |
| 5,361,850 | A | 11/1994 | Müller et al. | |
| 5,601,146 | A * | 2/1997 | Schlegel et al. | 172/439 |
| 5,690,182 | A * | 11/1997 | Ward | 172/439 |
| 5,743,339 | A * | 4/1998 | Alexander, III | 172/272 |
| D415,725 | S | 10/1999 | Wyant | |
| 6,390,490 | B1 * | 5/2002 | Campbell | 280/510 |
| 6,443,236 | B1 * | 9/2002 | Staude | 172/439 |

* cited by examiner

*Primary Examiner*—Jeff Restifo
(74) *Attorney, Agent, or Firm*—Frank A. Lukasik

(57) ABSTRACT

A combination of a tractor hydraulic arm assembly and a hitch adapter installed between the two arms of the arm assembly, the hitch adapter consisting of a length of "U" shaped steel channel, having a plurality of holes formed in the top surface, with trailer hitches mounted in the holes and a steel shaft fastened to the underside of the channel and a yoke mounted on each end of the channel. The steel shaft is mounted in holes formed in the arm assembly and locked in place with implement clips, with the yolks straddling the two arms to prevent rotation of the channel.

1 Claim, 2 Drawing Sheets

23
25
10
24
22
21

HYDRAULIC THREE POINT HITCH

RELATED INVENTION

Applicant claims priority based on Provisional Patent Application Ser. No. 60/436,973, Filed Dec. 30, 2002.

BACKGROUND OF THE INVENTION

1. Field of the Invention

The present invention relates generally to tractor hitches, and more particularly to an auxiliary member to which one or more hitch balls are mounted so as to provide a more versatile hitch for trailers of different tow weights. The hitch bar is mounted between two hydraulically controlled arms behind a tractor which can be raised to accommodate the mounting of trailers of different hitch heights.

2. Description of the Prior Art

Typically, tractors are mounted with a bar to which implements may be attached for agricultural use etc. Such bars do not allow the attachment of regular ball hitches as they only provide means for attaching round shafts to which ball hitches cannot be fitted due to the rotation of the shafts.

U.S. Pat. No. 6,443,236 to Staude discloses a three-point hitch for a tractor on which an attachment can be mounted and has its lower links pivotally connected to the tractor at the tractor side and actuated by hydraulic cylinders in mounts on a hitch bracket. The upper link can be a piston-and cylinder arrangement pivotally connected to the hitch bracket.

U.S. Pat. No. Des 341,810 to Cordia discloses a three point tow bar hitch with a single hitch ball. The tow bar is suspended between two side rails and includes a vertical attachment to an operating rod.

U.S. Pat. No. Des 415,725 to Wyant discloses a single rod with a rotatable plate having four different sized ball hitches mounted on the plate. The plate is held in position by a vertical rod secured by a cotter pin.

The present invention can be fitted to the lower links which are pivotally connected to the tractor because it contains two yolks which straddle the control arms preventing rotation of the hitch bar. The invention is therefor an adapter which can be retrofitted to a normal tractor without having to modify hydraulic gear or the attachment arms of the tractor.

SUMMARY OF THE INVENTION

The present invention is constructed from a piece of mild steel "U" channel to which two shafts are attached to protrude from each end. These shafts are offered up to the existing holes in the attachment of the tractor. Two "U" shaped yolks are attached to the rear face of the steel channel and they each straddle the attachment arms of the tractors so as to prevent rotation of the channel. This provides a rotationally stable platform for the attachment of the ball hitches.

It is one object of the invention, therefore, to provide an attachment means for towing trailers of various sizes and weights.

It is another object of the invention is to provide an adapter for converting a tractor's hydraulic implement arms to a hitch bar.

A still further object of the invention is to provide hitch bars of different sizes to fit different sizes and types of tractors.

DETAILED DESCRIPTION OF THE INVENTION

Figure 1:
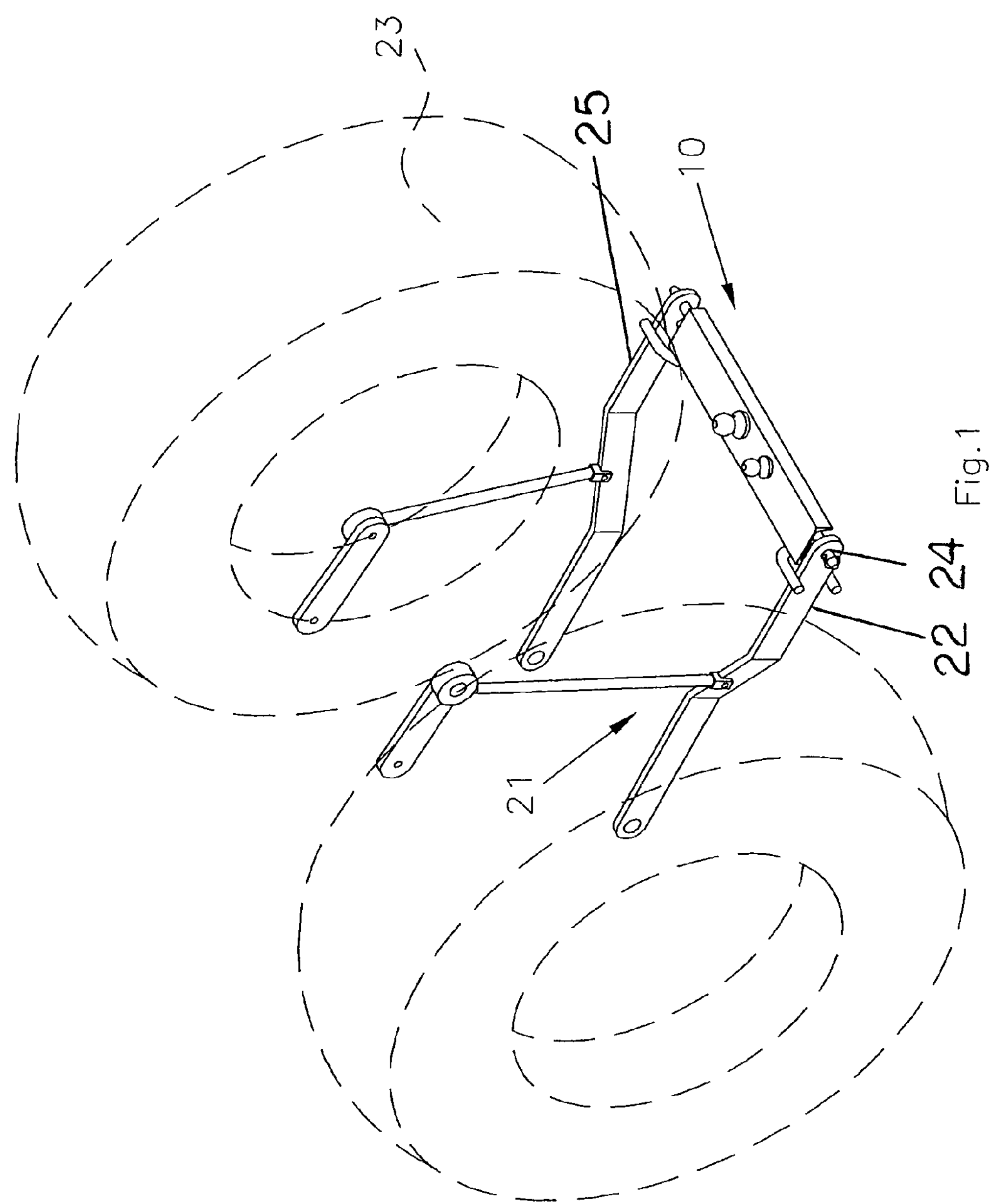
FIG. 1 is an isometric view, partially in section, of the invention as it appears when attached to a tractor.
Figure 2:
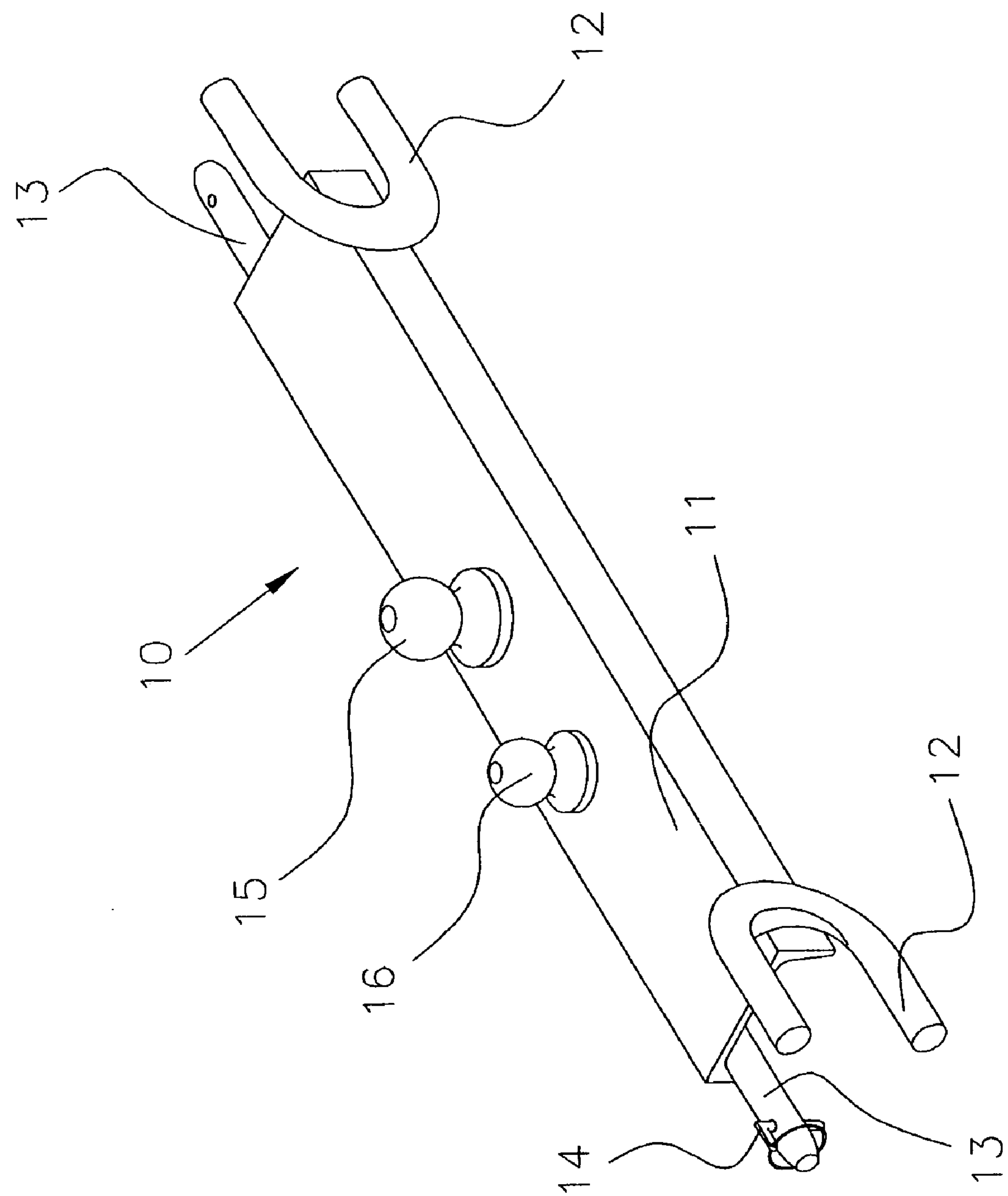
FIG. 2 is an isometric view of the invention showing the details of the invention.

Referring now to the drawings in which like numerals designate like and corresponding parts throughout the several views, in FIGS. 1 and 2, the invention is designated overall by the numeral 10. Tractor tires 23 straddle the hydraulic arm assembly 21 of the tractor. Hitch adapter 10 is mounted on the hydraulic arm assembly of the tractor as follows.

FIG. 2 shows the details of the hitch adapter 10 and includes a length of "U" shaped channel 11 which is installed between the two arms of the hydraulic arm assembly 21. Two hitch balls 15 and 16 are shown mounted on the top surface of channel 11. Shaft 13 is mounted on the underside of channel 11. Shaft 13 is mounted through holes 24 located near the ends of arms 22 and 25. Shaft 13 extends from each end of channel 11. Implement clip 14 snaps over each end of shaft 13 to prevent the channel 11 from becoming detached from hydraulic arm assembly 21.

A "U" shaped yoke 12 is attached to each end of the channel 11. The yolks 12 are fastened to the rear face of the steel channel 11 and they each straddle the atachment arms 22 and 25 of the tractors so as to prevent the rotation of the channel 11. This provides a rotationally stable platform for the attachment of the ball hitches 15 and 16. Although the described invention shows the use of two trailer hitches, it is possible to mount more than two hitches on channel 11.

The above detailed description is given for explanatory purposes. It will be apparent to those skilled in the art that numerous changes and modifications can be made without departing from the scope of the invention. Accordingly, the whole of the foregoing description is to be construed in an illustrative and not a limitative sense.

What is claimed is:

1. A combination of a tractor hydraulic arm assembly and a hitch adapter installed between the two arms of said hydraulic arm assembly, said hitch adapter comprising:

a selected length of "U" shaped steel channel, said channel having an underside, a first end and a second end, a top surface and a rear face, said top surface having a plurality of holes formed therein, a steel shaft mounted on said channel underside, said steel shaft having a first end and a second end, said first and second ends extending beyond said first and second ends of said channel, said shaft having a hole formed near each of said ends, a "U" shaped yolk fastened to said rear face of said channel at each of said first and second ends of said channel, said hitch adapter being mounted on said hydraulic arm assembly having said first and second ends of said steel shaft mounted in holes formed in said hydraulic arm assembly and locking said shaft in place by inserting an implement clip in each of said holes formed in said shaft and locking said clips in place, and straddling said yolks over said hydraulic arm assembly, and mounting a plurality of trailer hitches in said holes formed in said channel.

* * * * *